United States Patent
Seshadri et al.

(10) Patent No.: US 10,185,675 B1
(45) Date of Patent: Jan. 22, 2019

(54) DEVICE WITH MULTIPLE INTERRUPT REPORTING MODES

(71) Applicant: Amazon Technologies, Inc., Seattle, WA (US)

(72) Inventors: Kiran Kalkunte Seshadri, Cedar Park, TX (US); Thomas A. Volpe, Austin, TX (US); Carlos Javier Cabral, Leander, TX (US); Steven Scott Larson, Georgetown, TX (US); Asif Khan, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 9 days.

(21) Appl. No.: 15/384,074

(22) Filed: Dec. 19, 2016

(51) Int. Cl.
| | |
|---|---|
| *G06F 13/24* | (2006.01) |
| *G06F 13/10* | (2006.01) |
| *G06F 13/28* | (2006.01) |
| *G06F 13/40* | (2006.01) |

(52) U.S. Cl.
CPC ............ *G06F 13/24* (2013.01); *G06F 13/102* (2013.01); *G06F 13/28* (2013.01); *G06F 13/4068* (2013.01)

(58) Field of Classification Search
USPC .................. 710/22–28, 48, 52, 56, 260–269
See application file for complete search history.

(56) References Cited

U.S. PATENT DOCUMENTS

| | | | |
|---|---|---|---|
| 5,943,507 A | 8/1999 | Cornish et al. | |
| 6,170,025 B1 | 1/2001 | Drottar et al. | |
| 7,769,923 B2* | 8/2010 | Pope | G06F 13/385 |
| | | | 710/22 |
| 8,732,263 B2* | 5/2014 | Muppalla | G06F 13/24 |
| | | | 709/212 |
| 2003/0065856 A1* | 4/2003 | Kagan | G06F 13/387 |
| | | | 710/263 |
| 2004/0028053 A1* | 2/2004 | Mes | G06F 13/30 |
| | | | 370/395.7 |
| 2008/0162763 A1* | 7/2008 | Bney-Moshe | G06F 9/4812 |
| | | | 710/263 |
| 2010/0192163 A1* | 7/2010 | Pope | G06F 13/385 |
| | | | 719/318 |
| 2012/0137029 A9* | 5/2012 | Hsin | G06F 1/3209 |
| | | | 710/22 |
| 2014/0006667 A1* | 1/2014 | Sun | G06F 13/24 |
| | | | 710/261 |
| 2014/0156894 A1* | 6/2014 | Tsirkin | G06F 13/24 |
| | | | 710/260 |

* cited by examiner

*Primary Examiner* — Raymond N Phan
(74) *Attorney, Agent, or Firm* — Robert C. Kowert; Meyertons, Hood, Kivlin, Kowert & Goetzel, P.C.

(57) ABSTRACT

Peripheral devices may implement multiple reporting modes for signal interrupts to a host system. Different reporting modes may be determined for interrupts generated at a host system. Reporting modes may be programmatically configured for various operations at the peripheral device. Reporting modes may indicate a reporting technique for transmitting an indication of the interrupt and may indicate a priority assigned to reporting the interrupt. An interrupt controller for the peripheral device may report generated interrupts according to the reporting mode determined for the interrupts.

20 Claims, 8 Drawing Sheets

DEVICE WITH MULTIPLE INTERRUPT REPORTING MODES

BACKGROUND

Network communications are foundational to the operation of many different systems and devices. Large public networks, such as the Internet, or smaller private networks, such as corporate intranets, facilitate communications between different systems or devices, from clients of services that provide storage, computing, or data delivery to hosting internal web sites or network tools accessible to a small number of users. Such networks utilize large numbers of networking devices to facilitate the fast and reliable delivery of data, network packets, from one system to another.

Leveraging the power of network communications has greatly increased the demand upon networking devices to receive, process, and send network packets. In turn, this increased demand has led to a higher occurrence rate for errors and other events that may need resolution in a networking device. A common configuration for networking devices includes networking processing resources hosted by a system that implements other computing resources, such as a general purpose processor. When errors or other events occur that need resolution, such as an error detected in a forwarding route, an indication of the error may be provided to the other computing resources of the host system to correct the identified error in the forwarding route. Processing such errors or events may be limited by the speed at which the indications can be provided to the other computing resources of the host system. Therefore, improvements in communicating error or event indications can lead to a quicker resolution of errors or events, reducing the cost such errors or events may impose on processing network communications.

Figure 1:
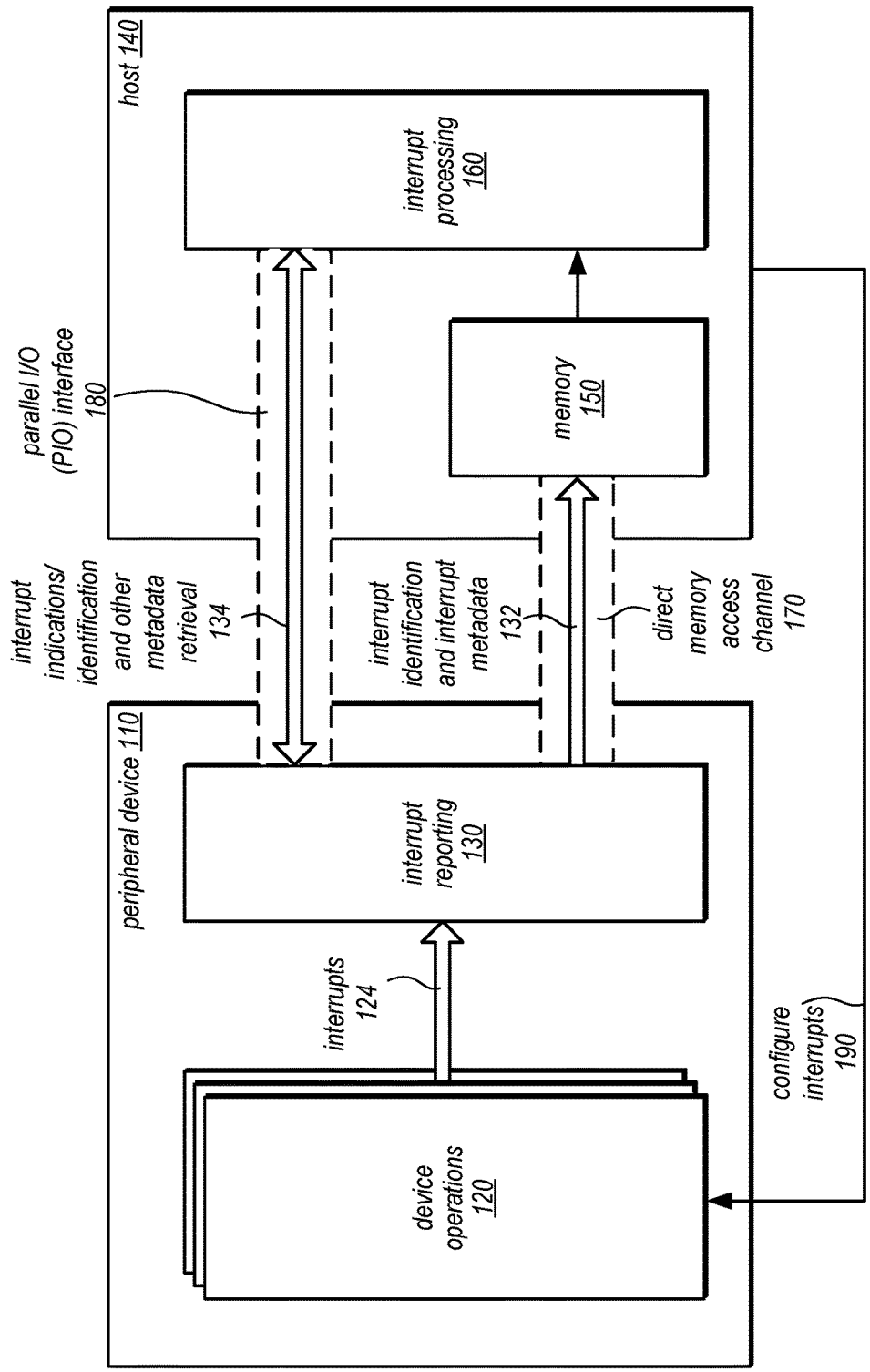
FIG. 1 illustrates a logical block diagram of multiple reporting modes for signaling interrupts, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement multiple reporting modes for interrupts. Computing resources, such as various kinds of servers, computers, and other computing devices may utilize peripheral devices to expand the capabilities of the computing resources beyond that which the underlying hardware of the computing resources can provide. Thus, additional graphics processing capabilities, network processing capabilities, storage processing capabilities, or other computing capabilities may be changed as result of installing peripheral devices. For example, in at least some embodiments, networking devices may install or connect multiple peripheral devices that perform network packet processing. As part performing, operating, or implementing the additional capabilities that peripheral devices provide, errors or events may occur that may depend upon a host system for the peripheral device in order to resolve or otherwise take action with respect to the error or event. For example, peripheral devices may implement memory components which can be susceptible to data value corruption, creating data errors that affect the performance of operations on the peripheral device. In order to resolve the data value corruption, an interrupt may be signaled to the host system to determine a correct value to be restored to the memory component.

Providing information for processing interrupts to a host system may depend upon the communication channels that are implemented between a host system and a peripheral device. Different protocols, formats, or techniques may be implemented, such as Peripheral Component Interconnect (PCI) based protocols to facilitate communication between the host system and peripheral device. As a result interrupts may be reported in different ways. However, the way in which interrupts are reported may impact the speed at which interrupts can be processed and resolved. For example, some PCI-based interrupt reporting techniques involve multiple communications between a peripheral device and a host system (e.g., to indicate an interrupt and retrieve identification of the interrupt and other metadata describing the event or error). While resolving some interrupts may not be time-sensitive, in some scenarios the speed at which interrupt resolution is performed may impact the performance of the peripheral device. For example, in a peripheral device implementing a network packet processor, an interrupt may be triggered as a result of an error detected in a routing table for forwarding network packets. Until the error in the routing table is corrected, network packets that are processed using the erroneous data are likely to be dropped (instead of forwarded). The faster the routing table error is corrected by resolving the interrupt, the smaller the number of network packets may be dropped.

In at least some embodiments, multiple reporting modes may be implemented for reporting interrupts from a peripheral device to a host system. In this way, faster interrupt signaling techniques may be employed for time-sensitive errors or events that trigger interrupts, and slower interrupt signaling techniques may be employed for errors or events that are not as sensitive to slower interrupt resolution times. For example, in at least some embodiments, time sensitive interrupts may be reported in a reporting mode that uses a direct memory access (DMA) channel between a peripheral device and host, as depicted in FIG. 1. Other reporting modes may use communication techniques, such as other Parallel Input/Output (PIO) communication techniques, to report other less time sensitive interrupts. In addition to identifying a reporting technique, reporting modes may be used to prioritize interrupts, by assigning interrupts priority values, types, or other designations that are used to select faster or slower reporting paths according to the assigned priority values. For example, high priority and low priority queues may be implemented so that an interrupt with a reporting mode indicating a high priority may be placed in the high priority queue of interrupts to be signaled to host resources or writing to a high priority interrupt location in host memory. In at least some embodiments, the generation of interrupts may be configurable so that a host system may programmatically define the reporting mode of interrupts generated by a particular operation or in certain conditions at the peripheral device.

FIG. 1 illustrates a logical block diagram of multiple reporting modes for signaling interrupts, according to some embodiments. Peripheral device 110 may be connected to a host 140 via a peripheral interconnect (which may be any kind of expansion bus standard, such as peripheral component interconnect (PCI), PCI extended (PCI-X), PCI express (PCIe), or accelerated graphics port (AGP)). Peripheral device 110 may communicate with host 140 via the peripheral interconnect using different techniques to provide different reporting modes, such as DMA channel 170, or PIO 180.

Peripheral device 110 may implement or perform various device operations 120 in various combinations of hardware and/or software. For example, in graphic processing peripheral devices (e.g., graphics cards installed in a host system expansion slot), different rendering operations or game physics calculations may be performed as part of providing graphics processing. Similarly, networking processing devices (e.g., a packet processor installed in a host system expansion slot, such as discussed below with regard to FIGS. 2 and 3), may implement different packet forwarding operations to direct received network packets to a destination, such as implementing multiple common format interrupt interfaces (e.g., FIG. 5) and accumulators (e.g., FIG. 6), which may be connected by a ring bus to interrupt controller to handle large numbers of different interrupts that may be generated at a peripheral device 110. As part of performing device operations 120, different interrupts 124 may be detected. An interrupt may triggered by different errors, conditions, or events detected before, during, or after different device operations 120. For example, a link at a packet processing peripheral device may become unavailable, triggering an interrupt for the link down event to indicate which link is unavailable.

Figure 3:
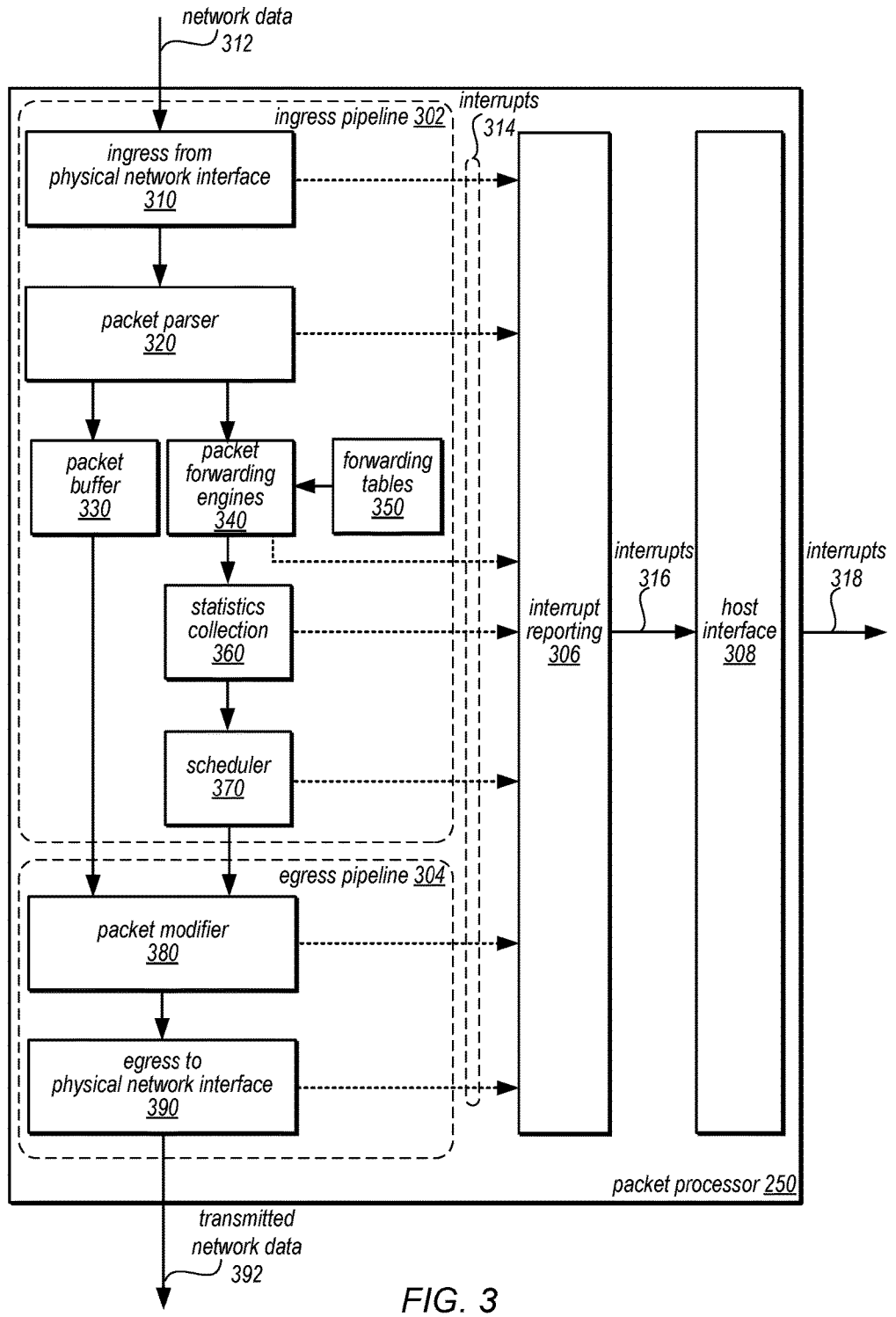
FIG. 3 is a logical block diagram illustrating a packet processor that reports interrupts generated by the packet processor according to different reporting modes, according to some embodiments.
Figure 4:
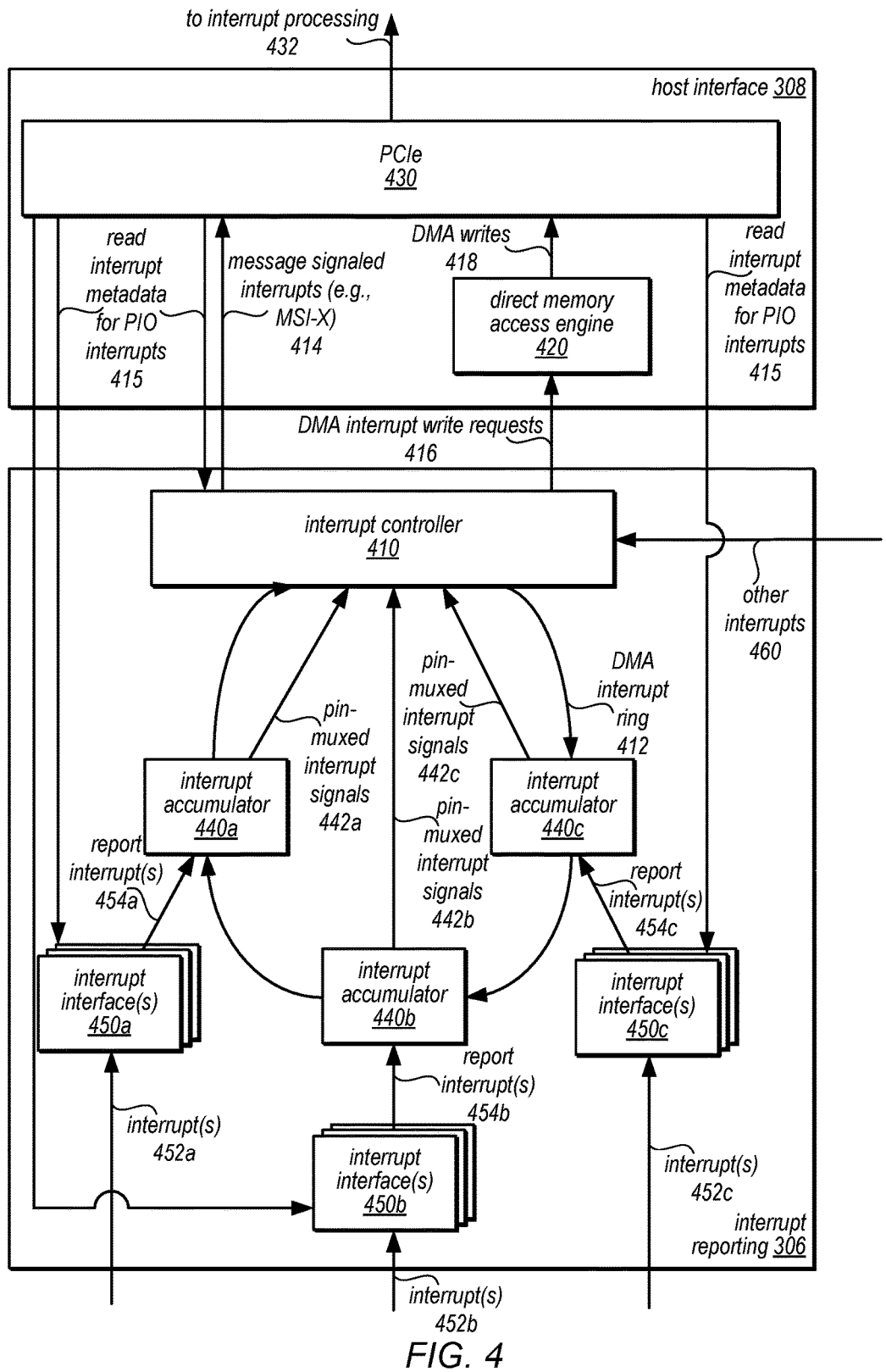
FIG. 4 is a logical block diagram illustrating an interrupt reporting architecture that reports interrupts using multiple reporting modes, according to some embodiments.

In order to report interrupts 124 to host 140 for resolution, the triggered interrupts 124 may be provided to interrupt reporting 130. Different techniques for providing interrupts 124 to interrupt reporting 130 may be implemented. FIGS. 3 and 4, for instance, provide many examples of techniques for providing interrupts to interrupt reporting 130. Interrupts 124 may include or be associated with a reporting mode, in various embodiments. The reporting mode may indicate a technique for signaling the interrupt to host 140. For example, in some embodiments, interrupt reporting 130 can utilize DMA channel 170 to report interrupt identifications and other interrupt metadata 132 for processing the interrupt directly to host 140 by writing the interrupt identification and other interrupt metadata into memory 150, which may be accessed by interrupt processing 160. The interrupt may then be signaled to host processing 140 (e.g., via a message signaled interrupt using the PIO interface 180 or by writing an indication register or location at host 140 or peripheral device 110 that interrupt processing 160 may check to see if an interrupt is indicated). Other interrupt reporting techniques, such as providing an identification and other metadata for processing an interrupt to interrupt processing 160 in response to requests to obtain the data via PIO 180, may be indicated by a reporting mode. As noted above, a reporting mode may indicate a priority assignment or other direction for reporting the interrupt. The reporting mode for interrupts 124 may be configured 190, in some embodiments, by host 140, by writing control registers, updating firmware, or performing another other actions to change device operations 120.

Interrupt reporting 130 may detect the reporting mode for interrupts 124 and direct reporting of the interrupt according to the determined reporting mode. Thus, interrupts 134 with reporting modes indicating signaling via PIO 180, may be signaled via PIO 180 and interrupts 132 with reporting modes indicating signaling via DMA channel 170 may be signal via DMA channel 170. The technique for signaling the interrupt may also determine what information is communicated when signaling the interrupt. For example, in embodiments where DMA channel 170 is indicated for an interrupt, the interrupt metadata (e.g., identification describing the event or error and/or any other information that may be needed by interrupt processing 160 to resolve the interrupt) may also be written along with the interrupt indication. In this way, interrupt processing 160 (e.g., a host central processing unit (CPU) may access memory 150 directly to get the information needed to process interrupts 132 without further interaction with peripheral device 110). Whereas, for interrupt indications 134 provided to interrupt processing 160 without metadata, multiple read requests may be taken by interrupt processing 160 via PIO interface 180 to retrieve 134 the interrupt metadata from locations where it is maintained at peripheral device 110. By reducing the number of interactions between peripheral device 110 and host 140, reporting interrupts via DMA channel 170 may decrease the time to resolve interrupts 132 when compared with reporting interrupts via PIO 180 (which would rely upon further communications between host 140 and peripheral device 110 before the interrupt could be resolved).

This specification begins with a general description of a networking device acting as a host system for one or multiple peripheral devices that are packet processors, which may implement multiple reporting modes for signaling interrupts from the packet processor(s) to the networking device. Then various examples of a packet processor are discussed, including different components/modules, or arrangements of components/modules that may be implemented and which may generate interrupts and report the interrupts according to different reporting modes. A number of different methods and techniques to implement multiple reporting modes are then discussed, some of which are illustrated in accompanying flowcharts. Various examples are provided throughout the specification.

Network packets are packets of data (e.g., datagrams) sent across a network from a source networking device (e.g., a network interface card implemented at a computer or server) to a destination networking device. The network may include many other networking devices, such as various kinds of switches, routers, network bricks, or any other device capable of receiving, processing, and/or sending the network packets across links between the networking devices in the network.

The path or route which a network packet travels may be determined according to forwarding decisions made at various networking devices in a network. A packet processor implemented as a peripheral device connected to a networking device that is a host system for the peripheral device, for instance, may receive a network packet and make forwarding decisions with respect to the content of information in the network packet, such as various packet header fields. Consider a network packet that includes a destination address formatted in accordance with Internet Protocol (IP). A forwarding route may be an address or portion of an address which if matching the destination address for the network packet, identifies forwarding decision(s) to be made with respect to the network packet, such as a next hop address. Once a forwarding decision is made, modifications to the packet may be performed, and the packet sent to a next networking device connected to the current networking device (or the networking packet may be dropped). Forwarding of the network packet may continue amongst the networking devices of a network until the network packet reaches the desired destination.

In addition to processing network packets received at a networking device, networking devices may generate additional network packets and process and forward them accordingly. Generated network packets may include mirrored versions of network packets (e.g., encapsulated remote spanned (ERSPAN) packets sent via user datagram protocol (UDP) or generic route encapsulation (GRE)), sample packets from one or more different network flows (e.g., sFlow, NetFlow, or internet protocol flow information export (IP-FIX) packets), statistical data (e.g., network traffic information), or any other network packet generated by or originating from the networking device (e.g., which may be network packets generated by a packet processor instead of network packets received at the packet processor for processing from a remote packet processor or networking device or host computing device, such as general processor(s) 230 in FIG. 2).

Forwarding decisions may be determined in one or more stages, such as destination resolution stages, for received and generated network packets. Different lookup operations to determine actions to be performed with respect to a network packet may be identified for a network packet by reading different entries in different lookup tables associated with the destination resolution stages. For example, a destination resolution stage may be used to obtain information to initiate tunneling for a network packet, provide multipath lookups, obtain labels to add to a packet for multiprotocol label switching, determine a next hop address, perform fast re-route, or implement link aggregation. During the course of processing network packets through the different stages of the packet processor, different events or errors may be generated and/or detected. Memory errors, data collection, operating conditions, or debug or test features are some of the many different kinds of events or errors that may trigger corresponding interrupts. Because packet processing devices may implement many different stages or potentially trigger many different interrupts, multiple reporting modes for signaling interrupts may result in significant performance improvement for resolving time-sensitive errors or events.

Figure 2:
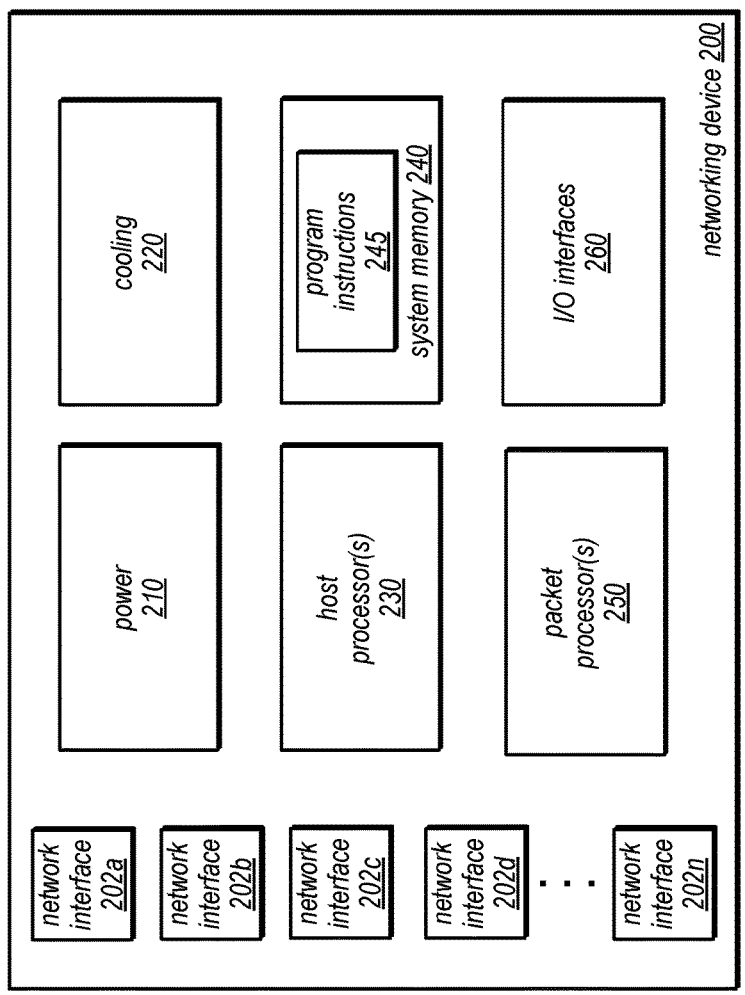
FIG. 2 is a logical block diagram illustrating a networking device that implements a packet processor that signals interrupts using multiple reporting modes, according to some embodiments.

FIG. 2 is a logical block diagram illustrating a networking device that implements a packet processor that signals interrupts using multiple reporting modes, according to some embodiments. Networking device 200 may be a networking device configured to route, forward, or otherwise facilitate the communication of different devices, systems or networks via network connections to the networking device. A networking device may provide electrical and logical network connections. Networking devices may operate utilizing data included in different OSI layers, such as layers 2 and 3 to make forwarding determinations (e.g., to send a network packet received from one source connected to the switch to another source connected to the switch). Please note that networking devices, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of networking device 200.

Networking device 200 may include general processor(s) 230 which may include multiple cores (and which may be single or multi-threaded) coupled to a system memory 240 via an input/output (I/O) interface 260. Networking device 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement various management functions and interfaces for networking device 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. Program instructions 245 may also implement a controller or host that is configured to interface with packet processor(s) 250. For example, a controller may be configured to program memory devices with new or additional information (e.g., update next hop tables, pointer tables, action tables, insert or remove forwarding routes, etc.). For example, a controller may be configured to program the hash schemes that generate hash keys to locate entries in pointer tables (e.g., by specifying different fields for in a packet header), as well as distribution schemes for mapping hash values to a group of entries in a pointer tables. A controller may, in some embodiments, be configured to change the pointers and pointer type values associated with particular entries (e.g., in accordance with a change in a forwarding route) in order to reconfigure the processing of different packets at destination resolution stages in a packet processor. A controller may also perform configure the reporting of interrupts, such as discussed above with regard to FIG. 1, by defining reporting modes for different interrupts generated at packet processor(s) 250.

A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g., SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to perform various switch management operations). In one embodiment, I/O interfaces 260 may be configured to coordinate I/O traffic between processor 230, system memory 245, packet processor(s) 250, and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

As noted in FIG. 2, one or multiple packet processors 250 may be implemented to process data received via network interface(s) 202 at networking device 200. Packet processor(s) 250 may be implemented as dedicated hardware to perform various stages of packet processing for networking device 200. For example, packet processor(s) 250 may be implemented as an application specific integrated circuit (ASIC), field programmable gate array (FPGA), system-on-a-chip (SoC), or other dedicated circuitry that performs packet processing. Packet processor(s) 250 may also be implemented as a software-based packet processing pipeline to perform various stages of packet processing for networking device 200 (e.g., via program instructions executing on one or more general processors 230). Packet processor(s) 250 may be assigned to one or multiple network interface(s) 202, performing dedicated processing of network data received via the assigned network interface(s) 202. FIG. 3 is a logical block diagram illustrating a packet processor that reports interrupts generated by the packet processor according to different reporting modes, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350. Ingress pipeline 302 may also access packet tables 350 and other packet routing information. Egress pipeline 304 may include a packet modifier 370 with access to other packet modification data, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different layer headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340. In some embodiments, packet parser 320 may determine different hash key values to determine an entry in pointer tables in different destination resolution stages (e.g., a tunnel initiation stage, multipath stage, or link aggregation stage) from various packet header fields (e.g., fields from layers 1, 2, 3, and 4 of the network packet and bits from the UDF) either for received network packets or network packets generated by packet processor 250, in some embodiments. Hash key values generated for a network packet can be generated for a specific type of network packet (e.g., IP or MPLS) and may be generated according to one of many different hash functions (e.g., CRC16-CITT and CRC16-IBM).

Packet forwarding engines 340 may access data stored in packet tables 350 to make forwarding and tunneling decisions for the network packet based on information in the packet header (e.g., including source and destination addresses) extracted by packet parser 320. For example, packet forwarding engines 340 may perform lookups for data in layer 2 (L2) portions of the packet to perform L2 forwarding. Similarly, packet forwarding engines 340 may also perform lookups for data in layer 3 (L3) portions of the packet to perform L3 forwarding, in some embodiments. For example, internet protocol (IP) headers for the packet may be evaluated with respect to entries in tables, such as a routing or next hop table, to determine forwarding to be performed. In at least some embodiments, packet forwarding engines 340 may implement one or more destination resolutions stages (e.g., as part of a destination resolution pipeline) to determine forwarding decisions for network packets. For example, various destination resolution stages may include such as a tunnel initiation stage, multipath stage, multiprotocol label switching (MPLS) outer label stage, next hop address stage, fast re-route stage, and link aggregation stage. As packet forwarding engines 340 make forwarding decisions about the packet (e.g., for L2, L3 and/or tunneling), the decisions are maintained as packet metadata. The packet metadata may be provided to scheduler 370 for scheduling determinations.

As discussed above, packet tables 350 may be implemented in one or multiple storage devices, such as various memory devices (e.g., a CAM, such as a TCAM, and/or random access memory, such as SRAM) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

In at least some embodiments, ingress pipeline 302 may implement statistics collection 360. Statistics collection 360 may collect statistics based on the network packets processed through ingress pipeline 302. For example, various counters may be maintained for events occurring during processing by packet forwarding engines 340 (e.g., such as forwarding table 350 hits including VLAN table, MAC address table, routing table, adjacency table, next hop table, tunnel start table, tunnel termination table, and/or actions table). Statistics collection 360 may also collect statistics and information concerning traffic flow and network visibility through packet processor 250, for example, by detecting, measuring, and exporting flow cache entries for large traffic flows, by sampling, aggregating, and exporting snippets (e.g., 128 bytes) from network packets from small traffic flows, and/or determining the number of unique traffic flows.

Scheduler 370 may control the buffering of packets and scheduling of operations within packet processor 250. For example, scheduler 370 may implement a memory management unit to allocate available memory segments in packet buffer 330 to store packets to be buffered. If a packet needs to be buffered (e.g., because the egress interface is congested), scheduler 370 may store the packet in a private pool of memory assigned to a particular physical interface port for the packet or shared pools of memory to store packets (e.g., if the private pool of memory is full). Scheduler 370 may also implement a memory management unit to dequeue packets from packet buffer 330 for final processing and egress. Scheduler 370 may provide the appropriate metadata for a packet to modifier 360. Although not illustrated in FIG. 3, packets from packet buffer 330 and packet metadata from scheduler 370 may be moved from ingress pipeline 302 to egress pipeline 304 via a crossbar. A crossbar may, for example, be implemented by one or more destination rings to transmit a network packet from the ingress pipeline 302 via egress pipeline 304 to a desired destination port.

Network packets that have passed through ingress pipeline 302 may be scheduled or released from packet buffer 330 for modification, reassembly and egress as part of egress pipeline 304. Packet modifier 380 may be implemented to modify packet headers based on the routing decisions indicated in the packet metadata determined by packet forwarding engines 340. For example, if tunneling is enabled for a packet, packet modifier 380 may create and insert the appropriate tunnel header in order to encapsulate at least a portion of the packet to implement a tunneling protocol. Packet modifier 380 may also perform modifications to other data in the packet header. Once the modified packet has been reassembled, egress unit to physical network interface 390 may utilize the physical layer (PHY) interface and the Ethernet Media Access Control (MAC) layer interface to transmit network packets as network data 392 via the appropriate physical connection (e.g., coaxial, twisted pair, or optical cable).

As part of the various operations, calculations, transformations, and other actions taken during stages in ingress pipeline 302 and egress pipeline 304, interrupts 314 may be generated. For example, interrupts may be generated to indicate various errors or events, such as SRAM or TCAM parity bit errors or error correction code errors, invalid table entries, routing table misses, physical connection errors, Media Access Control (MAC) or Physical Coding Sublayer (PCS) errors, statistics collection events, link events, thermal events, or generated packet events. Metadata may be generated as part of the triggering error or event indicating the type of error or event (e.g., correctable or uncorrectable error correction code errors), which component, process, or operation generated the event, and any other information needed to resolve the event. Different formats and/or information for the interrupt metadata may be defined according to a format type for the interrupts 314. Interrupt identifications and other interrupt metadata may be generated according to the reporting mode programmed for the event by the networking device controller, as noted above. The reporting mode may be included or discoverable from the interrupt and interrupt metadata that are generated. Interrupts 314 may be provided to interrupt reporting architecture 306 (e.g., one or more components or stages in a pipeline for reporting interrupts), as discussed below with regard to FIG. 4. Interrupt reporting 306 may then report the interrupts 316 according to the reporting mode identified for the interrupts 316 via host interface 308, signaling interrupts 318 to host processor(s) 230 implementing the controller for the packet processor.

FIG. 4 is a logical block diagram illustrating an interrupt reporting architecture that reports interrupts using multiple reporting modes, according to some embodiments. Interrupt reporting architecture 306 may implement an interrupt controller 410, which supports multiple reporting modes, such as PIO and DMA modes as discussed above in FIG. 1. In the PIO mode, an interrupt accumulator 440 signals the interrupts to the interrupt controller 410. Interrupt controller 410 then generates a message signaled interrupt 414 message via PCIe bus interface 430 to the host CPU performing interrupt processing 432 messages to the Host CPU. The host CPU then reads 415 inform one or multiple locations in the packet processor 250 to find the source of the interrupt, read the interrupt metadata, and then clear the interrupt (e.g., from interrupt controller 410 and the interrupt interface that generated the interrupt, such as from interrupt metadata registers 514 in FIG. 5). In DMA mode, interrupt controller 410 receives interrupts and interrupt metadata from DMA interrupt ring 412 by an interrupt accumulator (e.g., 440*a*) next to the interrupt controller 410 in the ring 412, interrupt accumulator 440*b*. Interrupt controller 410 receives the identification of interrupts and other interrupt metadata and sends as DMA interrupt write requests 416 to DMA engine 420 which performs DMA writes through interrupt DMA channel(s) via PCIe 430 to write the identification of the interrupt and other interrupt metadata directly in host processor 230 memory (e.g., system memory 240). Interrupt controller 410 may also send message signaled interrupt messages 414 to indicate that the interrupt has been written to host memory. Other types of interrupts 460 (e.g., generated by other components outside of ingress and egress pipelines) at packet processor 250 may be directly signaled to interrupt controller 410, bypassing the other portions of interrupt reporting architecture 306, in some embodiments.

Interrupt reporting architecture 306 may offer various performance improvements in scenarios where large numbers of possible interrupts may need to be reported. For example, packet processor 250 may include multiple implementations of ingress pipeline 302 and egress pipeline 304 for respective physical interfaces to packet processor 250 (e.g., 4 sets of ingress and egress pipelines at packet processor 250 for 4 physical interfaces) resulting in thousands of possible interrupts that may be generated and reported. Instead of implementing customized interfaces for each stage or component generating an interrupt, a standardized interrupt interface 450 may be respectively implemented for the different stages or components generating interrupts so that interrupt reporting may be reported leveraging the same architecture. Please note that FIG. 4 is not intended to be limiting as to the number or layout of the same or different components that may be included in a reporting architecture. For example, a different number of interrupt accumulators (and assigned interrupt interfaces) may be included in the interrupt DMA interrupt ring bus than is depicted in FIG. 4.

Figure 5:
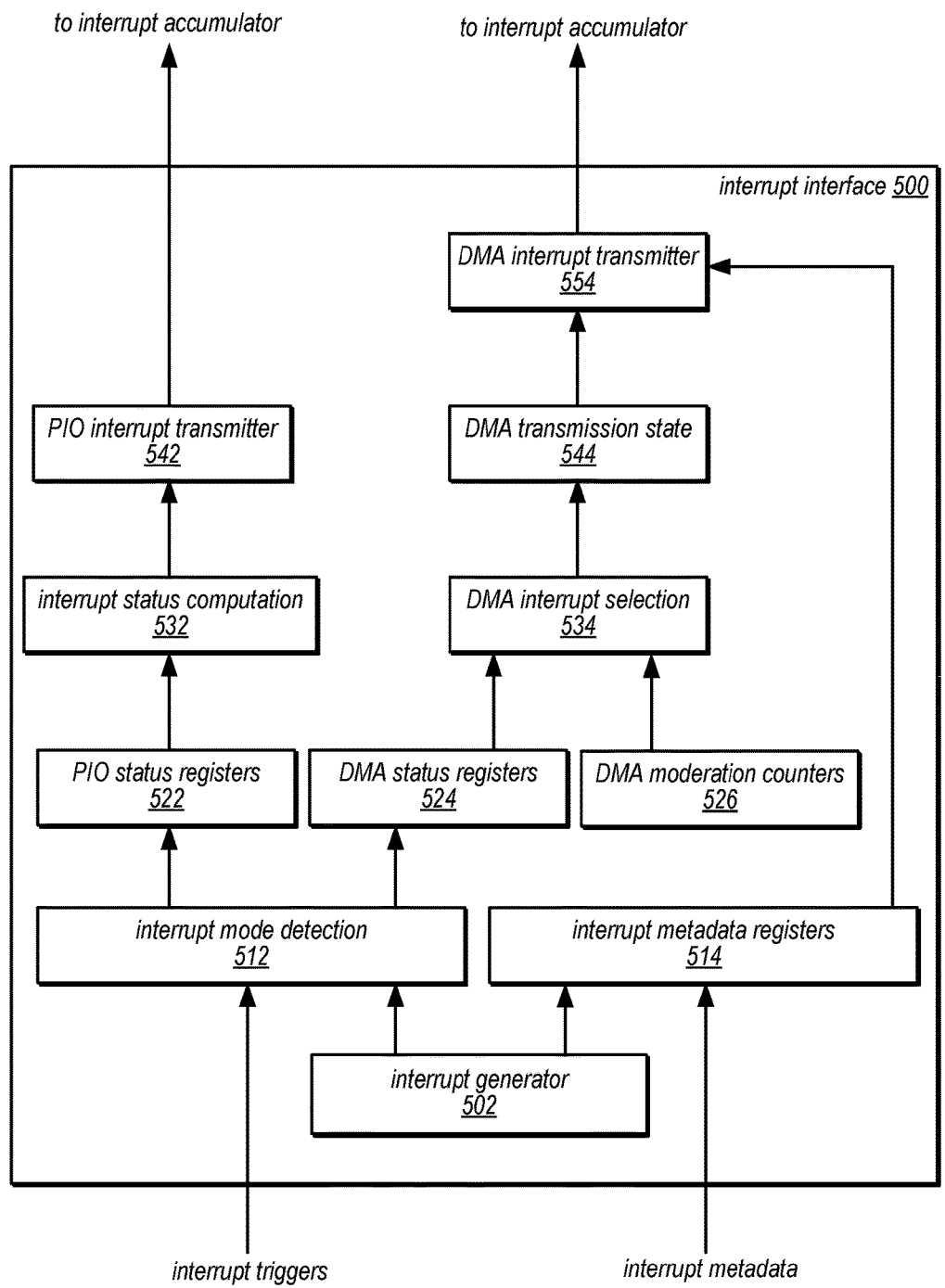
FIG. 5 is a logical block diagram illustrating an interrupt interface, according to some embodiments.

FIG. 5 is a logical block diagram illustrating an interrupt interface, according to some embodiments. Interrupt interface 500 may receive interrupt triggers and interrupt metadata from a generating component or stage. Interrupt interface 500 may implement interrupt mode detection 512 to determine or identify a reporting mode for the triggered interrupt. For example, interrupt mode detection may evaluate a mode or type set of bit values that are mapped to different reporting modes to identify whether to report the interrupt using DMA or PIO techniques. If PIO is detected, then PIO status registers 522 may be updated to include information indicating the interrupt (e.g., identifying what interrupts are pending and/or received interrupts that may be masked). Then interrupt status computation 532 may evaluate the PIO status registers 522 to select which PIO interrupt should be transmitted next (as multiple PIO interrupts could be pending in PIO status registers). PIO interrupt transmitter 542 may send an interrupt signal to an interrupt accumulator for interface 500 (e.g., interrupt interface(s) 450*a* may report interrupts 454*a* to interrupt accumulator 440*a*, interrupt interface(s) 450*b* may report interrupts 454*b* to interrupt accumulator 440*b*, interrupt interface(s) 450*c* may report interrupts 454*c* to interrupt accumulator 440*c*, and so on). Interrupt metadata for interrupts with reporting modes indicating PIO reporting may store interrupt metadata in interrupt metadata registers 514, which host CPU 230 may access later via the PIO interface to retrieve the metadata to resolve the interrupt.

For interrupts with reporting modes indicating a DMA transmission of the interrupt, DMA status registers 524 may be written to indicate the interrupt. DMA interrupt selection may implement arbitration and/or selection techniques to select a next DMA interrupt for transmission. For example, DMA moderation counters 526 may be implemented as part of selection scheme to count the different types of events that are reported by interrupts and so that DMA interrupt selection may implement a round-robin arbitration scheme to ensure that interrupts of different types (e.g., different error or event types) may be selected equally before reporting another interrupt of the same error or event type. In at least some embodiments, DMA transmission state 544 may be implemented to maintain information describing the interactions between interrupt interface 500 and the assigned interrupt accumulator (e.g., storing information to implement a credit-based arbitration scheme to select which interrupt provided to an accumulator should be selected next for transmission along the DMA interrupt ring 412). DMA interrupt transmitter may then send selected DMA interrupts along with the interrupt metadata for the interrupt from interrupt metadata registers 514 to the assigned interrupt accumulator.

Figure 6:
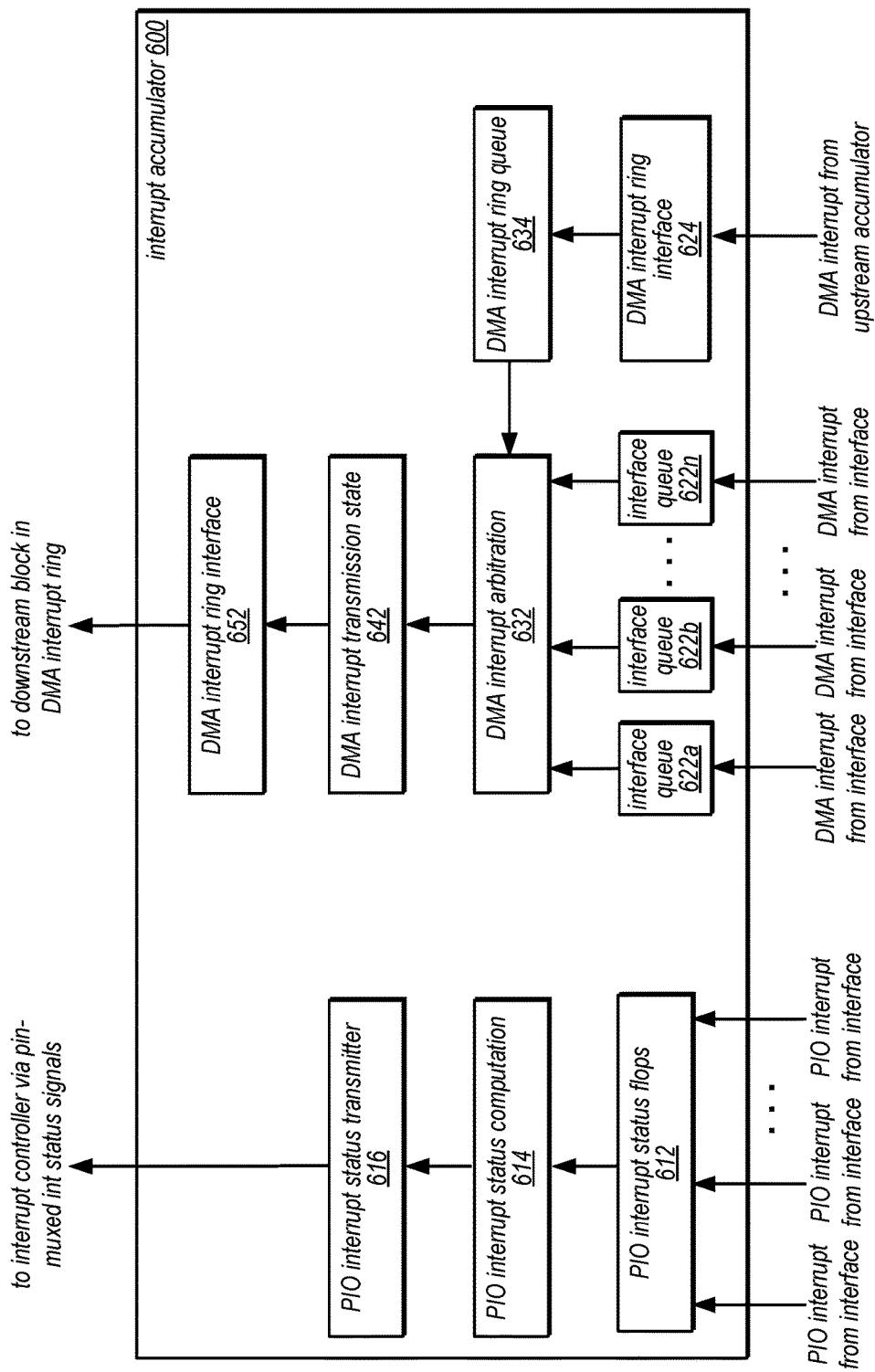
FIG. 6 is a logical block diagram illustrating an interrupt accumulator, according to some embodiments.

Multiple interrupt interfaces may be assigned to a single interrupt accumulator, in various embodiments. In this way, the number of separate physical connections that would have to be created between each interrupt generating stage or component and the interrupt controller can be significantly reduced, allowing for large numbers of interrupts to be reported within limited chip area, as the interrupt accumulator may aggregate and select interrupts for transmission to the interrupt controller. FIG. 6 is a logical block diagram illustrating an interrupt accumulator, according to some embodiments.

PIO interrupts from different interrupt interfaces may be received at PIO interrupt status flops 612 which may retain interrupt indications until PIO interrupt status computation 614 can select an interrupt to send via PIO interrupt stats transmitter 616. PIO interrupts may be sent as pin-muxed signals directly to interrupt controller 410 with a valid signal and data signal each clock cycle (e.g., pin-muxed interrupt signals 442 as depicted in FIG. 4). If, for example, an interrupt indication is provided as a 32 bit value, then PIO interrupt status transmitter 616 may send the interrupt indication in 32 clock cycles directly to interrupt controller 410.

For DMA interrupts, respective interface queues (e.g., interface queue 622*a*, 622*b*, through 622*n*) for each assigned interface may be implemented to queue the DMA interrupts (e.g., the identification of interrupts and other metadata for the interrupts). FIFO queues, for instance, may be implemented to provide first in first out selection of interrupts from an interface to DMA interrupt arbitration 632. DMA interrupt arbitration 632 may be implemented to select which interrupt to transmit downstream along the DMA interrupt ring bus. For example, DMA interrupt arbitration 632 may utilize a weighted round robin schema to select from amongst interrupts in the interface queues 622. Additionally, DMA interrupts may be provided from upstream interrupt accumulators (which DMA interrupt arbitration 632 may also consider when applying an arbitration scheme). Consider interrupt accumulator 440*b* in FIG. 4. Interrupt accumulator 440*c* may receive DMA interrupts 454*c* from interrupt interfaces 450*c* and select one to transmit along DMA interrupt ring 412, which interrupt accumulator 440*b* may receive as the downstream accumulator in DMA interrupt ring 412. Turning back to FIG. 6, interrupt accumulator 600 may implement DMA interrupt ring interface 624 to receive the upstream DMA interrupts and place them into DMA interrupt ring queue 634 for consideration by DMA interrupt arbitration 632. Once selected, DMA interrupts may be transmitted by DMA interrupt ring interface 652 to the downstream block in the DMA interrupt ring 412 (which may be another interrupt accumulator or interrupt controller 410. In at least some embodiments, interrupt accumulator 600 may implement DMA interrupt transmission state in order to maintain information about the weight or consideration that the interrupt accumulator 600 should apply to upstream DMA interrupts versus interrupts received from interrupt interfaces. In this way, weights can be maintained that ensure that neither the interrupts from the interfaces nor the interrupts from other accumulators starve the transmission of interrupts of the other source of interrupts.

Figure 7:
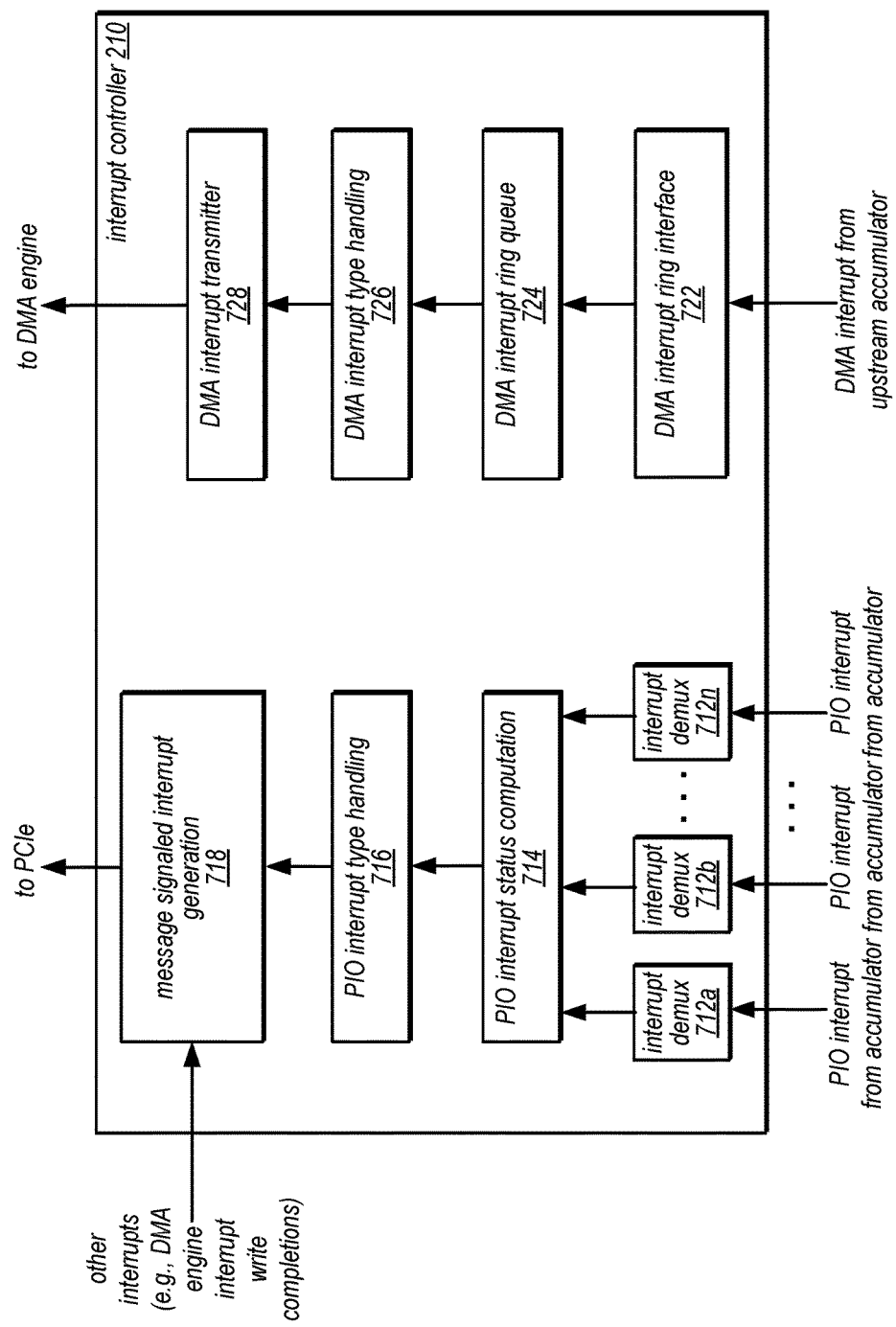
FIG. 7 is a logical block diagram illustrating an interrupt controller, according to some embodiments.

FIG. 7 is a logical block diagram illustrating an interrupt controller, according to some embodiments. For PIO interrupts, interrupt controller 210 may implement corresponding interrupt demuxes (e.g., interrupt demux 712*a*, 712*b*, through 712*n*) for each interrupt accumulator 440. Interrupt status computation 714 may determine interrupt indications received via the pin-muxed signals may then be provided to interrupt status computation 714, which may select interrupts to provide to PIO interrupt type handling 716. Different reporting modes may indicate different types of handling for PIO interrupts. For example, some PIO interrupts may be identified as low priority or high interrupts, and thus PIO interrupt type handling 716 may select high priority interrupts for transmission before low priority interrupts. Message signaled interrupt (MSI) generation 718 may utilize MSI-based techniques to report interrupts via PCIe 430 at host interface 308. For example, MSI-X vector tables and controls may be implemented to map interrupts to MSI-X vectors which are then transmitted to host processor CPU 230. MSI generation 718 may implement a variable number of interrupt vectors, which may be programmed or mapped to interrupt types with PIO reporting modes (e.g., by a controller for packet processor 250). In some embodiments, MSI generation may provide single function or multi-function modes for combining PIO interrupts received from interrupt accumulators and other interrupts (e.g., other interrupts 460). In multi-function mode, each interrupt source for other interrupts 460 as interrupt accumulator interrupts may have a respective set of MSI-X events that are used to report the respective interrupts. In single function mode, events from other sources and interrupt accumulators may be combined and mapped using the same MSI-X events. Completion indications from the DMA engine may also be received at MSI generation 718 in order to send interrupt signals indicating the presence of identification and other metadata for an interrupt in system memory.

DMA interrupts may be received at interrupt controller 210 from the upstream interrupt accumulator (e.g., interrupt accumulator 440a) from the DMA interrupt ring bus 412 via DMA interrupt ring interface 722. DMA interrupt ring queue 724, such as a FIFO queue, may be implemented to queue received interrupts for transmission. DMA interrupt type handling 726 may determine whether a reporting mode for an interrupt indicates a high priority interrupt or a low priority interrupt. High priority interrupts may be placed in a high priority queue, while low priority interrupts may be placed in a low priority queue. Interrupts from the high priority queue may be transmitted before interrupts from the low priority queue, in some embodiments. DMA interrupt transmitter 728 may then obtain interrupts from the different priority queues for transmission to the host processor 230 via DMA engine 420 and PCIe 430. In some embodiments, high-priority interrupts may be written to a high-priority location within system memory. Similarly, low priority interrupts may be written to another location in system memory (which may give the host system the flexibility to arbitrate between processing interrupts with different priorities. MSI events may also be sent via PCIe to indicate that the DMA interrupt has been transmitted to host memory.

The examples of multiple reporting modes for signaling interrupts as discussed above with regard to FIGS. 2-7 have been given in regard to a packet processor implemented as part of a networking device. Note that various other types or configurations of networking devices that implement packet processors or other peripheral devices with other capabilities may implement these techniques. In addition to examples given above, the techniques discussed below with regard to FIG. 8 may be also implemented using the various components discussed above as well as different types of systems or devices that report interrupts to a host system.

Figure 8:
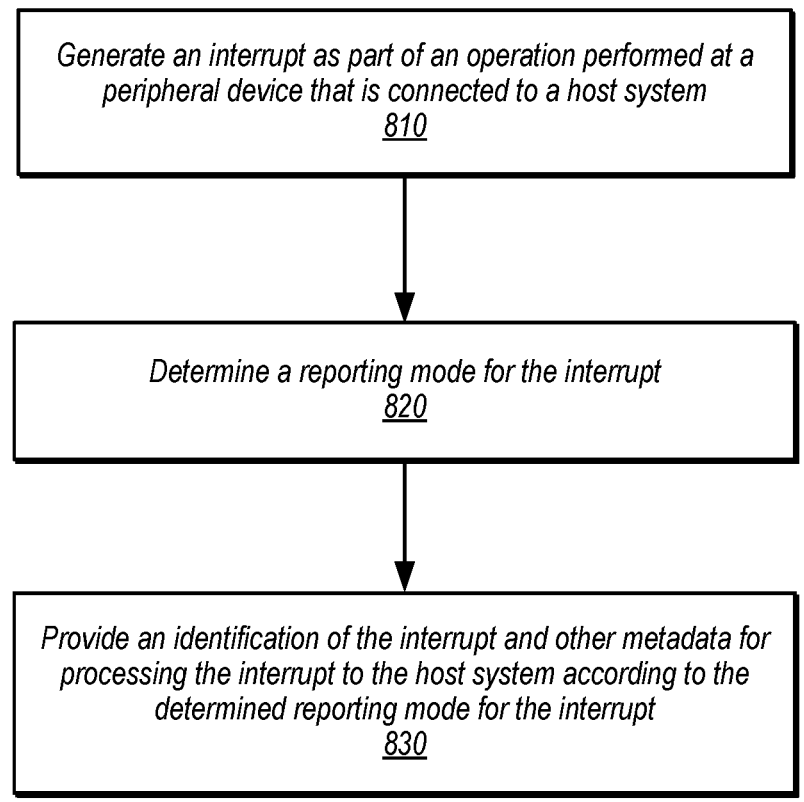
FIG. 8 is a high-level flowchart illustrating various methods and techniques to implement multiple reporting modes between a peripheral device and a host system, according to some embodiments.

FIG. 8 is a high-level flowchart illustrating various methods and techniques to implement multiple reporting modes between a peripheral device and a host system, according to some embodiments. As indicated at 810, an interrupt may be generated at a peripheral device as part of an operation performed at a peripheral device. Interrupts may be generated in response to an error or event detected as part of performing the operation. For example, hardware failures, logic errors, unresolved decisions, or any other action to be taken to correct or otherwise resolve the error or event at the host system. The interrupt may be generated to include an indication of the error or event (e.g., a location or component with the error, or the type of the error or event, such as the type of decision to be resolved). Metadata further describing the interrupt may also be generated including further information about the event or error, such as including a timestamp or other information indicating when the event or error occurred, as well as input data or output data generated as part of the operation that triggered the event or error.

As indicated at 820, a reporting mode for the interrupt may be determined. An interrupt controller or other interrupt reporting architecture may be able to utilize multiple techniques for reporting interrupts. A reporting mode for the interrupt may indicate which reporting technique to use, as well as other information about how to control, mask, or prioritize the interrupt. For example, as noted above priority values or indications may be assigned to interrupts (e.g., high or low) in addition to the communication technique for reporting the interrupt (e.g., PIO or DMA). Reporting modes are not hardcoded, in some embodiments, but may be programmatically defined for errors or events that trigger events. For example, a host system may write status registers or load firmware to configure a processing stage to trigger interrupts with a reporting mode including DMA reporting and a high priority assignment (e.g., for routing table errors in a packet processor). By allowing reporting modes to be programmatically defined, peripheral device performance may be changed or reprioritized to reflect different modes of operation for the peripheral device (e.g., test/debug mode or standard operating mode). The generated interrupt indications or metadata for the interrupt may indicate the reporting mode (e.g., by including a flag, indicator, value, or other information that would allow the reporting mode to be discovered).

Once determined, an interrupt controller for the peripheral device may provide an identification of the interrupt and other metadata for processing the interrupt to the host system according to the determined reporting mode for the interrupt, as indicated at 830. Thus if the reporting mode indicates that the interrupt is a low priority interrupt to be reported via a PIO technique, the interrupt controller may generate the appropriate MSI vector to signal the interrupt when the interrupt becomes the next low priority interrupt to be selected for transmission. The identification and the other metadata for the interrupt may then be provided to the host system via a PIO interface in response to requests to read the identification and other metadata received from the host (e.g., by storing the metadata in locations accessible to the host system and by providing the locations to the host system). In another example, if the reporting mode indicates that the interrupt be reported according to a DMA technique, then an identification of the interrupt and other metadata for processing the interrupt may be reported by writing the identification and other metadata to system memory at the host system via a DMA channel and providing an indication that the metadata for the interrupt is in the system memory to the host system (e.g., via an MSI).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A networking device, comprising:
a plurality of physical network interfaces;
a packet processor, comprising an interrupt controller and different packet processing stages to process network packets received via the physical network interfaces;
a host processor;
a memory;
the packet processor, configured to:
generate an interrupt request at one of the different packet processing stages;
generate, by the interrupt controller, an interrupt of the host processor responsive to receipt of the interrupt request, wherein to generate the interrupt the interrupt controller is configured to:
write metadata, including an identification of the interrupt and other metadata for processing the interrupt, to the memory via a direct memory access (DMA) channel between the peripheral device and the memory; and
send an indication that the metadata is written to the memory to the host processor;
the host processor, configured to:
read the metadata from the memory; and
process the interrupt according to the metadata.

2. The networking device of claim 1,
wherein the packet processor is further configured to:
generate another interrupt request at a different one of the packet processing stages;
generate, by the interrupt controller, another interrupt of the host processor responsive to receipt of the other interrupt request, wherein to generate the other interrupt the interrupt controller is configured to send an indication of the other interrupt to the host processor;
wherein the host processor is further configured to:
receive the indication of the other interrupt;
retrieve, via a parallel input/output (PIO) interface, metadata for the other interrupt from the packet processor; and
process the other interrupt according to the metadata.

3. The networking device of claim 1, wherein the packet processor further comprises a plurality of interrupt interfaces implemented as part of the different packet processing stages, wherein the packet processor further comprises a plurality of interrupt accumulators connected to the interrupt controller via a ring bus, wherein the interrupt interfaces are assigned to different ones of the interrupt accumulators, wherein interrupt requests generated at the different packet processing stages including the interrupt request are provided to the interrupt accumulators via the assigned interrupt interfaces, and wherein the interrupt request is provided to the interrupt controller via the ring bus from one of the interrupt accumulators.

4. The networking device of claim 2, wherein the host processor is further configured to:
prior to the generation of the interrupt and the other interrupt, programmatically configure generation of the interrupt to indicate DMA reporting and generation of the other interrupt to indicate PIO reporting.

5. A method, comprising:
generating, by a peripheral device connected to a host system, an interrupt request as part of an operation performed at the peripheral device;
determining, by the peripheral device responsive to receiving the interrupt request at an interrupt controller within the peripheral device, a reporting mode for the interrupt request, wherein the determined reporting mode is one of a plurality of reporting modes that the interrupt controller is configured to perform; and
generating, by the interrupt controller, an interrupt of the host system, comprising providing, by the interrupt controller, an identification of the interrupt and other metadata for processing the interrupt to the host system according to the determined reporting mode for the interrupt request.

6. The method of claim 5, wherein the reporting mode indicates a priority for reporting the interrupt, and wherein providing the identification and other metadata for processing the interrupt to the host system according to the determined reporting mode comprises selecting the interrupt from amongst a plurality of interrupts to be reported according to the priority for the interrupt.

7. The method of claim 5, wherein the interrupt request is one of a plurality of interrupt requests generated by the peripheral device, wherein the plurality of interrupt requests are provided to an interrupt accumulator at the peripheral device, and wherein the method further comprises selecting, by the interrupt accumulator, the interrupt request to provide to the interrupt controller.

8. The method of claim 5, further comprising providing the identification of the interrupt and other metadata for processing the interrupt to the interrupt controller via a ring bus that connects different sources of interrupt requests, including a source that generated the interrupt request, to the interrupt controller.

9. The method of claim 5, wherein the determined reporting mode indicates direct memory access (DMA) reporting for the interrupt, and wherein generating the interrupt to the host system comprises writing the identification of the interrupt and other metadata for processing the interrupt to a memory at the host system via a DMA channel between the peripheral device and the host system.

10. The method of claim 5, wherein the peripheral device is a packet processor that processes network packets received at the packet processor via one or more physical network interfaces at the packet processor.

11. The method of claim 9, wherein the reporting mode indicates a priority for reporting the interrupt, and wherein writing the indication of the interrupt and other metadata for processing the interrupt to the memory at the host system via the DMA channel comprises determining a location in the memory to write the identification and other metadata according to the priority.

12. The method of claim 9, further comprising:
generating, by the peripheral device, another interrupt request as part of a different operation performed at the peripheral device;
determining, by the peripheral device responsive to receiving the other interrupt request at the interrupt controller, a reporting mode for the other interrupt request, wherein the determined reporting mode is a different one of the reporting modes, wherein the different reporting mode indicates parallel input/output (PIO) reporting for the other interrupt request; and
generating the other interrupt to the host system;

wherein an identification of the other interrupt and other metadata for processing the other interrupt is provided to the host system via a parallel input/output (PIO) interface in response to one or more requests from the host system to read the identification and other metadata via the PIO interface.

13. The method of claim 12, further comprising:
prior to the generating of the interrupt request and the other interrupt request, programmatically configuring, by the host system, generation of the interrupt to indicate DMA reporting and generation of the other interrupt to indicate PIO reporting.

14. A system, comprising:
a peripheral device connected to a host system, wherein the peripheral device comprises an interrupt reporting pipeline, wherein the host system comprises a processor and a memory;
the interrupt reporting pipeline, configured to:
receive an interrupt request that is generated as part of performing an operation at the peripheral device;
determine that direct memory access (DMA) reporting is identified for the interrupt request;
generate an interrupt of the host system, wherein to generate the interrupt the interrupt reporting pipeline is configured to write metadata, including an identification of the interrupt and other metadata for processing the interrupt to a memory at the host system via a DMA channel between the peripheral device and the host system;
the host system, configured to:
access the memory to read the metadata for the interrupt; and
process the interrupt according to the metadata read from the memory.

15. The system of claim 14,
wherein the interrupt reporting pipeline, is further configured to:
receive another interrupt request that is generated as part of performing a different operation at the peripheral device;
determine that parallel input/output (I/O) reporting is identified for the other interrupt request;
generate another interrupt of the host system, wherein to generate the other interrupt the interrupt reporting pipeline is configured to send an indication of the other interrupt to the host system;
wherein the host system, is further configured to:
receive the indication of the other interrupt;
retrieve, via a parallel input/output (PIO) interface, an identification of the other interrupt and other metadata for processing the other interrupt from the peripheral device; and
process the other interrupt according to the metadata.

16. The system of claim 14, wherein the interrupt reporting pipeline is further configured to:
determine a priority for generating the interrupt; and
place the metadata in a DMA transmission queue corresponding to the determined priority, wherein the metadata is retrieved from the DMA transmission queue prior to the writing of the metadata to the memory at the host system via the DMA channel.

17. The system of claim 14, wherein the interrupt reporting pipeline comprises a plurality of interrupt interfaces implemented as part of the different packet processing stages, and wherein the interrupt request is received via one of the interrupt interfaces.

18. The system of claim 14, wherein the peripheral device comprises an application specific integrated circuit (ASIC), a system-on-chip (SoC), or a field-programmable gate array (FPGA) that implements the interrupt reporting pipeline.

19. The system of claim 15, wherein the host system is further configured to:
prior to the generation of the interrupt request and the other interrupt request, programmatically configure generation of the interrupt to indicate DMA reporting and generation of the other interrupt to indicate PIO reporting.

20. The system of claim 17, wherein the interrupt reporting pipeline further comprises a plurality of interrupt accumulators connected to the interrupt controller via a ring bus, wherein interrupt requests, including the interrupt request, are generated as part of performing different operations at the peripheral device, wherein respective identifications and other metadata for interrupts, including the interrupt, are provided to the interrupt accumulators via the assigned interrupt interfaces, and wherein the respective identifications and other metadata for the interrupts are provided to the interrupt controller via the ring bus from one of the interrupt accumulators.

* * * * *